US008819725B2

(12) United States Patent
Anguiano et al.

(10) Patent No.: US 8,819,725 B2
(45) Date of Patent: Aug. 26, 2014

(54) MESSAGE PRESENTATION APPARATUS, SYSTEMS, AND METHODS

(75) Inventors: Jason M. Anguiano, Castle Rock, CO (US); John Daniel Kliegel, Centennial, CO (US); William N. Moran, Highlands Ranch, CO (US); Nicholas B. Newell, Highlands Ranch, CO (US)

(73) Assignee: EchoStar Technologies Corporation, Englewood, CO (US)

( * ) Notice: Subject to any disclaimer, the term of this patent is extended or adjusted under 35 U.S.C. 154(b) by 904 days.

(21) Appl. No.: 11/962,989

(22) Filed: Dec. 21, 2007

(65) Prior Publication Data

US 2009/0165040 A1 Jun. 25, 2009

(51) Int. Cl.
*H04N 7/10* (2006.01)
*H04N 7/025* (2006.01)
*G06F 3/00* (2006.01)
*G06F 13/00* (2006.01)
*H04N 5/445* (2011.01)
*H04N 7/173* (2011.01)
*H04N 21/434* (2011.01)
*H04N 21/6332* (2011.01)
*H04N 21/426* (2011.01)
*H04N 21/258* (2011.01)
*H04N 21/472* (2011.01)

(52) U.S. Cl.
CPC ........... *H04N 5/445* (2013.01); *H04N 21/4348* (2013.01); *H04N 21/6332* (2013.01); *H04N 21/47211* (2013.01); *H04N 21/42684* (2013.01); *H04N 21/4345* (2013.01); *H04N 21/42692* (2013.01); *H04N 21/4263* (2013.01); *H04N 21/25808* (2013.01)
USPC .................. 725/32; 725/34; 725/37; 725/40; 725/51; 725/112

(58) Field of Classification Search
CPC .............. H04N 21/236; H04N 21/431; H04N 21/4316; H04N 21/432; H04N 21/6402
USPC .................................................. 725/32, 34, 35
See application file for complete search history.

(56) References Cited

U.S. PATENT DOCUMENTS 6,665,869 B1 12/2003 Ellis et al.
7,263,711 B1 8/2007 Estipona (Continued)

FOREIGN PATENT DOCUMENTS

WO 2007083824 A1 7/2007

OTHER PUBLICATIONS

Extended European Search Report dated Oct. 27, 2011, for EP Application No. 08172453.6, 8 pages.

*Primary Examiner* — Nasser Goodarzi
*Assistant Examiner* — Kyu Chae
(74) *Attorney, Agent, or Firm* — Seed IP Law Group PLLC

(57) ABSTRACT

An embodiment of a dynamic messaging system receives a message presentation request from a program distributor, the message presentation request having a first identifier that identifies the receiving device and a second identifier corresponding to one of a fixed message indicator and a dynamic message indicator. In response to receiving the message presentation request identifying the receiving device and the fixed message indicator, the dynamic messaging system retrieves a fixed message from a memory of the receiving device based upon the fixed message indicator. In response to receiving the message presentation request identifying the receiving device and the dynamic message indicator, the dynamic messaging system receives a dynamic message from an information stream communicated from the program distributor.

19 Claims, 5 Drawing Sheets

(56) References Cited

U.S. PATENT DOCUMENTS

| | | |
|---|---|---|
| 7,320,134 B1 * | 1/2008 | Tomsen et al. .................. 725/32 |
| 7,369,520 B2 * | 5/2008 | Luoma et al. ................. 370/312 |
| 2003/0227567 A1 | 12/2003 | Plotnick et al. |
| 2005/0015796 A1 | 1/2005 | Bruckner et al. |
| 2005/0235331 A1 | 10/2005 | Lynch |
| 2006/0037044 A1 | 2/2006 | Daniels |
| 2007/0107030 A1 * | 5/2007 | Zigmond ...................... 725/110 |
| 2007/0186269 A1 | 8/2007 | Malik |
| 2007/0266404 A1 * | 11/2007 | Estipona ......................... 725/51 |
| 2007/0266413 A1 | 11/2007 | Davis et al. |
| 2007/0300273 A1 * | 12/2007 | Turner .......................... 725/105 |
| 2007/0300280 A1 | 12/2007 | Turner et al. |
| 2008/0168500 A1 | 7/2008 | Carlson et al. |
| 2008/0196071 A1 | 8/2008 | Manthoulis |
| 2010/0169913 A1 * | 7/2010 | Ellis ............................... 725/25 |

* cited by examiner

MESSAGE PRESENTATION APPARATUS, SYSTEMS, AND METHODS

BACKGROUND

1. Technical Field

The technical field relates to presenting information via receiving devices and, more particularly, to apparatus, systems and methods for communicating messages for presentation.

2. Description of Related Art

Receiving devices are operable to receive programming content from a program distributor. The received programming content is then presented on a presentation device. At times, it is desirable to present a message. Such messages may be used to impart information to a viewer of the presentation device.

Receiving devices include some type of memory which stores information pertaining to the characteristics of the receiving device and the programming content. For example, during a boot-up or a start process, the receiving device memory includes sufficient information to enable the receiving device to acquire information from a program distributor such that the receiving device becomes operational. Also, the received information may be used to generate an electronic programming guide (EPG).

Additionally, other types of information may reside in the receiving device memory. For example, a plurality of predefined messages may reside in the memory. Location of the predefined messages in the memory may be indexed or identified by logical and/or physical address location information. An example predefined message may indicate to a viewer that an account balance is past due and that payment should be made to avoid a service interruption.

However, the use of predefined messages resident in the receiving device memory has several disadvantages. One disadvantage is that because of the limited capacity of the receiving device memory, the number and/or size of the fixed messages that may be stored in the receiving device memory is limited. Further, once a predefined message is stored into the receiving device memory, the predefined message cannot be easily changed.

BRIEF SUMMARY

Apparatus, systems and methods for communicating fixed messages and/or dynamic messages are disclosed. According to one embodiment, a process comprises receiving at a receiving device a message presentation request from a program distributor, the message presentation request having a first identifier that identifies at least one receiving device and a second identifier corresponding to one of a fixed message indicator and a dynamic message indicator; in response to receiving the fixed message indicator and the message presentation request identifying the receiving device as one of the at least one receiving devices, retrieving a fixed message from a memory of the receiving device based upon the fixed message indicator; in response to receiving the dynamic message indicator and the message presentation request identifying the receiving device as one of the at least one receiving devices, receiving a dynamic message via an information stream communicated from the program distributor; and presenting one of the fixed message and the dynamic message on the presentation device.

A system embodiment comprises a receiving device comprising a memory operable to store a fixed message indicator, a dynamic message indicator, and a fixed message, the fixed message stored at a location corresponding to the fixed message indicator; a tuner operable to receive a message presentation request having a first indicia that identifies at least one receiving device and a second indicia that specifies one of the fixed message indicator and the dynamic message indicator; and a processing system coupled to the tuner and the memory, and in response to the message presentation request identifying the receiving device as one of the at least one receiving device, is operable to retrieve the fixed message from the memory in response to the message presentation request having the second indicia corresponding to the fixed message indicator, to retrieve a dynamic message from an information stream in response to the message presentation request having the second indicia corresponding to the dynamic message indicator, and to present of one of the fixed message and the dynamic message on the presentation device.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
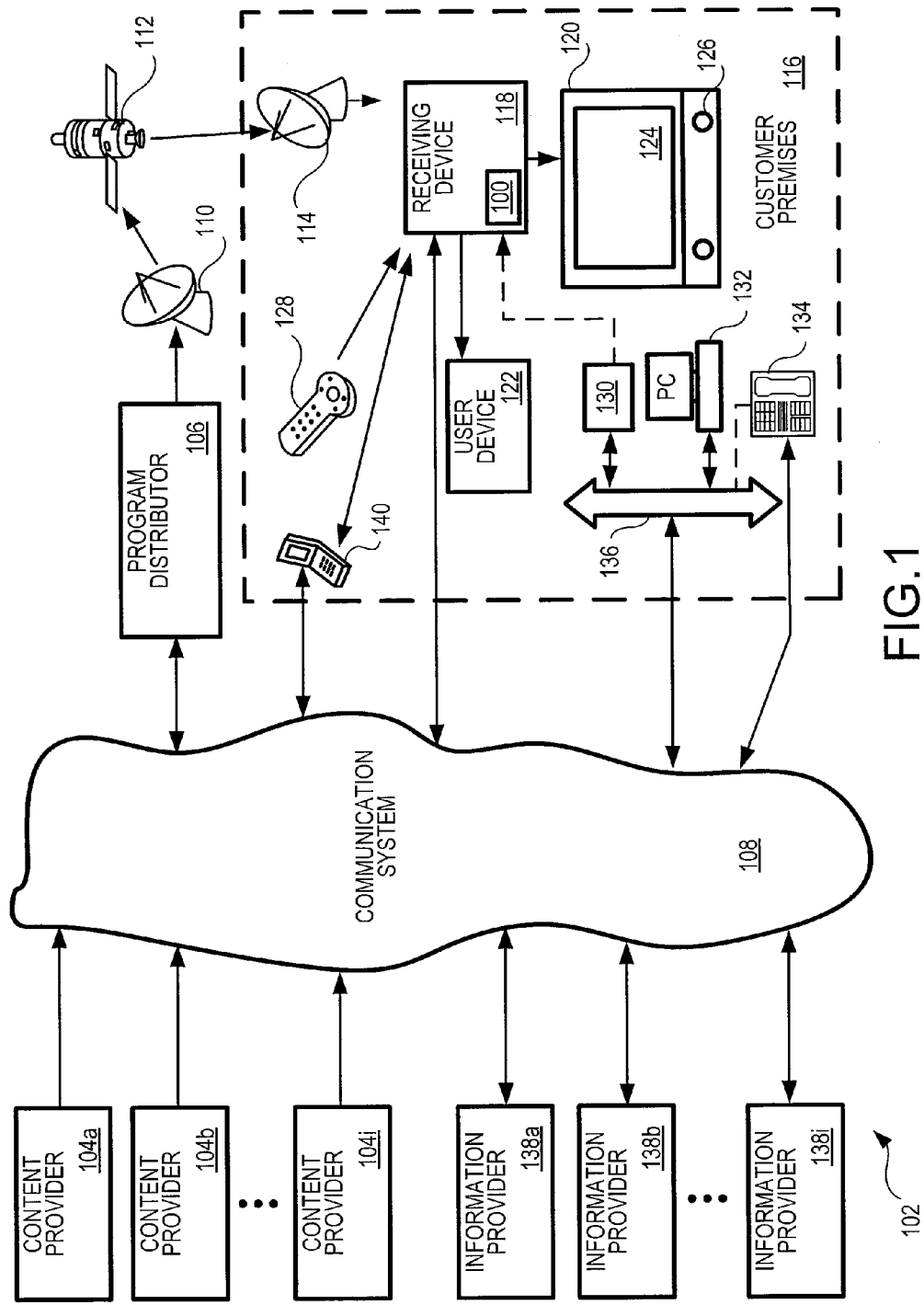
FIG. 1 is a block diagram illustrating an example embodiment of the dynamic messaging system.

FIG. 1 is an overview block diagram illustrating an example communication system 102 in which embodiments of the dynamic messaging system 100 may be implemented. It is to be appreciated that FIG. 1 is just one example of a communications system 102 and that the various embodiments discussed herein are not limited to such systems. Communication system 102 can include a variety of communication systems and can use a variety of communication media including, but not limited to, satellite wireless media.

Embodiments of the dynamic messaging system 100 are operable to present fixed messages and/or dynamic messages, described in greater detail hereinbelow, to a viewer. The dynamic messaging system 100 monitors received programming, and in response to receiving a message presentation request that targets the receiving device, the dynamic messaging system 100 retrieves and presents the message. If the message presentation request includes a request to present a fixed message, the fixed message is retrieved from a memory in the receiving device. If the message presentation request includes a request to present a dynamic message, the dynamic message is retrieved from an information stream, such as a program stream, service stream, messaging stream, or the like, communicated by the program distributor.

An overview of an example communication system 102 in which embodiments of the dynamic messaging system 100 may be implemented is now generally described. A plurality of content providers 104*a*-104*i* provide program content, such as television content or audio content, to a distributor, such as the program distributor 106. Example content providers 104*a*-104*i* include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, cable systems, fiber optic systems, microwave systems, asynchronous transfer mode (ATM) systems, frame relay systems, digital subscriber line (DSL) systems, radio frequency (RF) systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

The received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antennae 114 are operable to receive signals from a single satellite 112. Other types of receiver antennae 114 are operable to receive signals from multiple satellites 112 and/or from terrestrial based transmitters.

The receiver antenna 114 can be located at a customer premises 116. Often, the receiver antenna 114 is of a parabolic shape that may be mounted on the side or roof of a structure. Other antenna configurations can include, but are not limited to, phased arrays, wands, or other dishes. Examples of customer premises 116 include a residence, a business, or any other suitable location operable to receive signals from satellite 112.

Service providers, such as the example program distributor 106, provide their customers a multitude of audio/video and/or data programming (hereafter, collectively and/or exclusively "programming"). Such programming is often provided by use of a receiving device 118 (FIG. 1) communicatively coupled to a presentation device 120 configured to receive the programming.

The received signal is communicated from the receiver antenna 114, typically over a hard-wire connection, to a receiving device 118. Receiving device 118 is a conversion device that converts, also referred to as formatting, the received signal from antenna 114 into a signal suitable for communication to a presentation device 120, a recording device 122, or another device operable to couple to the receiving device 118.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and the recording device 122.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television (TV) or the like, and/or to a recording device 122.

It is to be appreciated that presentation device 120 may be any suitable device operable to present a program having video information and/or audio information. Examples of a presentation device 120 include, but are not limited to, a television (TV), a personal computer (PC), a sound system receiver, a digital video recorder (DVR), a compact disk (CD) device, a game system, or the like. Presentation devices 120 employ a display 124, one or more speakers 126, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

Recording device 122 may be any suitable device that is operable to receive a signal from the receiving device 118 and record the received program. Non-limiting examples of recording device 122 include optical media recorders, such as a compact disk (CD) recorder, a digital versatile disc or digital video disc (DVD) recorder, a digital video recorder (DVR), a personal video recorder (PVR), and personal computers (PCs).

Interface between the receiving device 118 and a user (not shown) may be provided by a hand-held remote device 128. Remote 128 typically communicates with the receiving device 118 using a suitable wireless medium, such as infrared (IR), RF, or the like. Other devices (not shown) may also be communicatively coupled to the receiving device 118 so as to provide user instructions. Non-limiting examples include game device controllers.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of recording devices 122 can be coupled, collectively referred to as endpoint devices. Non-limiting examples of network 136 include, but are not limited to, an Ethernet, twisted pair Ethernet, an intranet, a local area network (LAN) system, or the like. One or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

The above described uplink signal and down link signal generally pertain to a wireless communication system, and more particularly, to a satellite system. The uplink and downlink signals contain streams of programming content and other information, referred to herein as a program stream. Also, dedicated service streams may be used to communicate streams of non-programming information to the receiving devices 118. Alternatively, or additionally, information streams such as program streams and/or service streams may be communicated to the receiving devices via other media, such as a cable, fiber optic, Internet media, or the like.

The above description of communication system 102 and customer premises 116, and the various devices therein, is intended as a broad, non-limiting overview of an example environment in which various embodiments of the dynamic messaging system 100 may be implemented. Communication system 102 and customer premises 116, and the various devices therein, may contain other devices, systems and/or media not specifically described herein.

Figure 2:
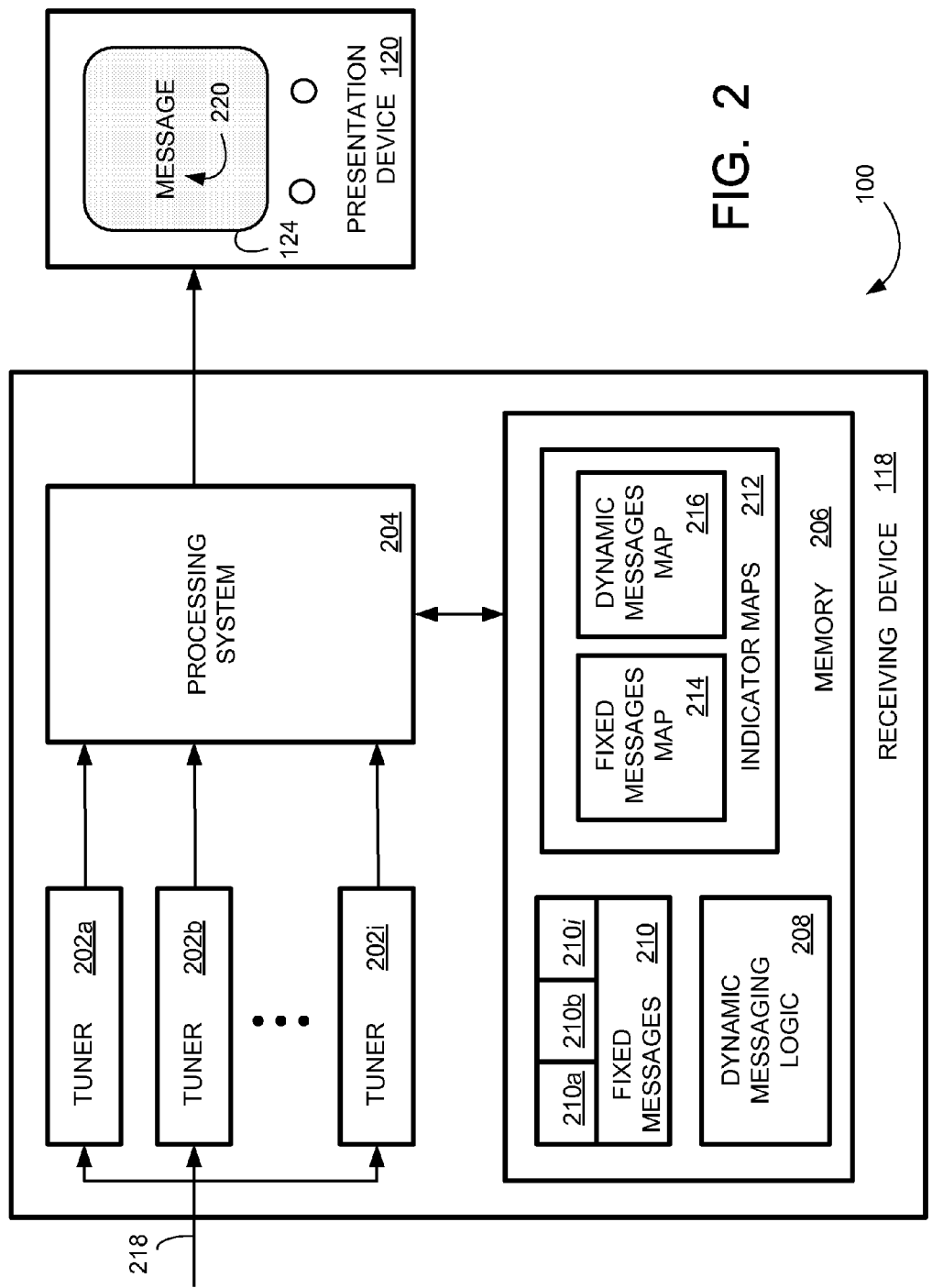
FIG. 2 is a block diagram illustrating an example dynamic messaging system embodied in a receiving device.

FIG. 2 is a block diagram illustrating an example dynamic messaging system 100 embodied in a receiving device 118. The receiving device 118 includes a plurality of tuners 202a-202i, a processing system 204, and a memory 206. Memory 206 includes regions for the dynamic messaging logic 208, a plurality of fixed messages 210, and the indicator map 212. The indicator map 212 includes fixed messages map 214 and the dynamic messages map 216.

In this example embodiment, a plurality of tuners 202a-202i receive information streams of programming information, and/or streams of service information, from the receiver antenna 114 or from another source of programming, via connection 218. Tuners 202a-202i tune to a selected program stream so that a particular program may be presented. Tuners 202a-202i may also tune to a service stream to receive service information. Some embodiments may include a single tuner 202a.

Processing system 204 receives one or more program streams from the tuners 202a-202i, and further processes the received programming into streams of video, audio, and/or other information for presentation on one or more presentation devices 120 and/or communication to another device, such as recording device 122 (FIG. 1). Processing system 204 may further perform a variety of functions during the processing of a program which is ultimately communicated to the presentation devices 120 or recording devices 122. Non-limiting examples include decryption of secure programs, demodulation of information in the received programs, formatting the information in the output into a digital or analog signal, preparing an electronic programming guide (EPG), or providing various "trick" functionality that is displayed to the user in a selectable format. Other functions not described above may also be performed by the processing system 208.

As noted above, memory 206 includes a region for storing one or more fixed messages 210, such as the example plurality of individual fixed messages 210a-210i. The fixed messages map 214 contains location information identifying the location in memory 206 where each of the fixed messages 210a-210ireside. For example, but not limited to, fixed messages map 214 may take the form of a table with indexing of logical location information and corresponding physical location information where the fixed messages 210a-210i reside in memory 206.

As described below, a message presentation request causes the receiving device 118 to retrieve a fixed message or a dynamic message. A message 220 (FIG. 2), corresponding to the fixed message or the dynamic message, is presented on presentation device 120.

In the illustrated example embodiment, the dynamic messaging system 100 is implemented primarily in software. In particular, the dynamic messaging logic 208 comprises one or more software modules containing instructions that, when executed, perform at least some of the functions of the dynamic messaging system 100. The video processing system 204 includes a processor that is configured to execute the instructions, and process the data, of the dynamic messaging system 100.

In some embodiments, some or all of the components of the dynamic messaging system 100 may be implemented or provided in other manners, such as at least partially in firmware and/or hardware, including, but not limited to one ore more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The dynamic messaging system 100 may be implemented and/or structured in various other ways. In particular, the functions of the dynamic messaging system 100 may be performed by a different arrangement of components and/or modules of the receiving device 118, including a greater or lesser number of components. For example, the fixed messages map 214 and the dynamic messages map 216 may actually be implemented as a single map, data structure, and/or data repository. Also, the dynamic messaging logic 208 may be implemented as multiple software modules, rather than a single module as illustrated.

Figure 3:
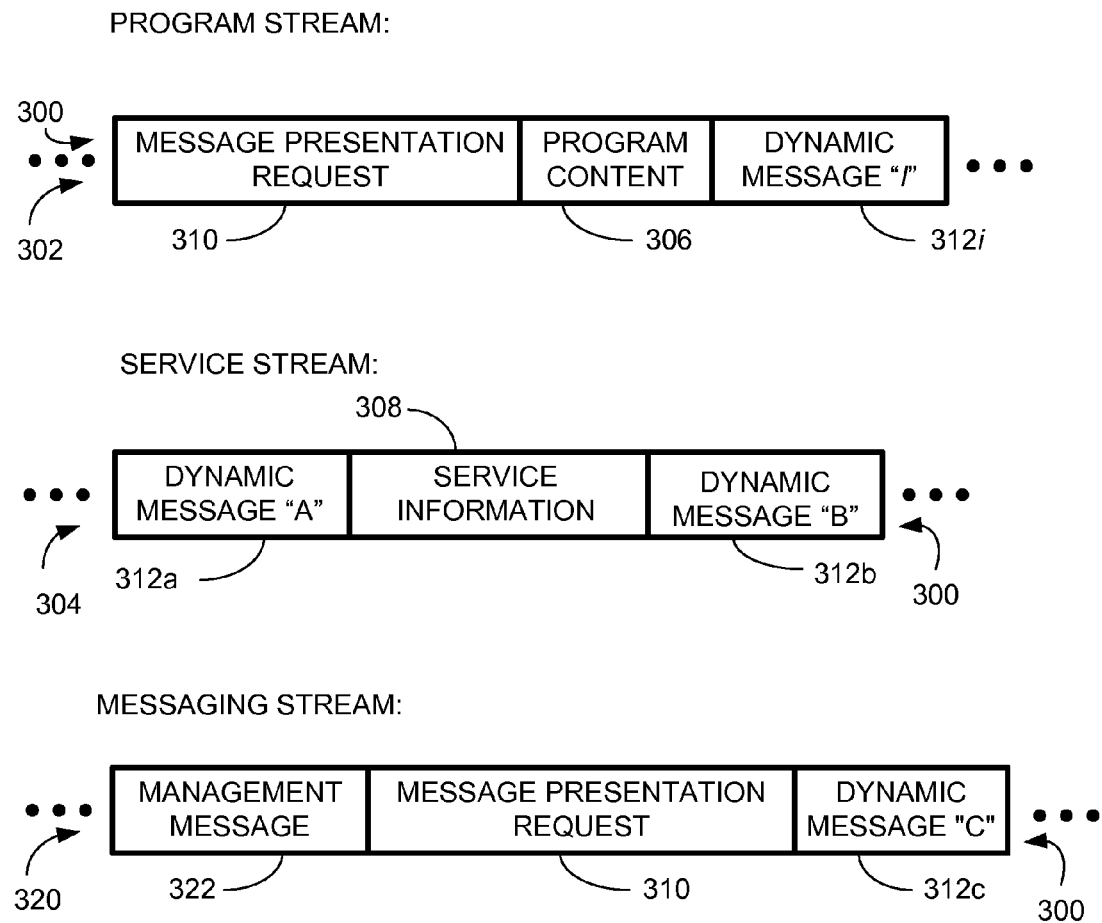
FIG. 3 conceptually illustrates information streams communicated by a program distributor to a receiving device.

FIG. 3 conceptually illustrates information streams communicated by a program distributor to a receiving device. In particular, FIG. 3 illustrates a program stream 302, a service stream 304, and a messaging stream 320 communicated by the program distributor 106 (FIG. 1) to the receiving device 118. During presentation of programming on a presentation device 120 (FIG. 1), the receiving device 118 receives the program stream 302 that has program content 306 therein. The program stream 302, service stream 304, and/or messaging stream 320 communicate a plurality of discrete portions of information 300, such as a packet or the like, in a serial manner. Each discrete information portion 300 is identified by a suitable identifier. Discrete information portions 300 may include MPEG packets, entitlement management and/or control messages, etc. In the illustrated embodiment, the discrete information portions 300 may include program content 306, service information 308, message presentation requests 310a-310c, management messages 322, and the like. Processing system 204 of the receiving device 118 generates a video and/or audio stream corresponding to a selected channel by monitoring the stream, by selecting information portions 300 which are associated with the selected program, and by constructing the selected information portions into a stream of video and/or audio information that is communicated to a presentation device 120.

In this example embodiment, the receiving device 118 has set one of its tuners 202a-202i (FIG. 2) to receive program stream 302. Program content 306 is retrieved from the program stream 302 and is processed by processing system 204 to generate a program, which is then communicated to presentation device 120 for presentation. It is appreciated that a plurality of programs may be communicated in a single program stream 302, and that the processing system 204 selects the program content 306 associated with a particular program and generates the program therefrom.

In some systems, the program distributor 106 may communicate a service stream 304 to receiving device 118. The service stream 304 includes service information 308 that is used for various operational functions. For example, the service information 308 may include information that is used to construct and/or update an electronic program guide (EPG). The EPG presents a menu to a viewer that indicates currently available programs, and programs scheduled for future presentation, in a manner that allows a viewer to dynamically select a program for presentation.

In addition, the program distributor 106 may communicate a messaging stream 320 to receiving device 118. The messaging stream 304 may include various types of management messages 322. Management messages may include any type of message used to enable, control, or otherwise manage the operational state of the receiving device 118. For example, the management message 322 may be or include an entitlement management message (EMM), an entitlement control message (ECM), or any other type of access or function control message.

At some point, the program distributor 106 may insert a message presentation request 310 into an information stream, such as program stream 302, into the service stream 304, and/or into the messaging stream 320, to cause the receiving device 118 to present either a fixed message or a dynamic message. In one embodiment, the message presentation request 310 contains a first indicia identifying the receiving device 118. The message presentation request 310 may further contain a second indicia corresponding to one or more fixed message indicators and/or dynamic message indicators. These indicators point to or otherwise identify the fixed and dynamic messages.

In general, message presentation requests communicated via a first information stream may refer to or otherwise indicate dynamic messages communicated via the first information stream or some other information stream. For example, message presentation request 310a, communicated via the program stream 302, may include a request to present dynamic message "A" 312a that is communicated via the service stream 304. In addition, message presentation request 310b, communicated via the messaging stream 320, may include a request to present dynamic message "B" 312b (communicated via the service stream 304) or dynamic message "C" 312c (communicated via the messaging stream 320).

In addition, the program stream 302, service stream 304, and messaging stream 320 may be communicated in various ways. For example, the information streams 302, 304, and 320 may all be communicated via a single carrier frequency of a satellite, wireless, and/or cable communication network. In other embodiments, the information streams 302, 304, and 320 may be communicated via distinct carrier frequencies of a satellite, wireless, and/or cable communication network. In yet other embodiments, the information streams 302, 304, and 320 may be communicated via distinct communication mechanisms. For example, the program stream 302 and service stream 304 may be communicated via a broadcast satellite network, while the messaging stream 320 may be communicated via an Internet Protocol network. Furthermore, in some embodiments, messages or information illustrated as being communicated via one or more of the information streams 302, 304, and 320 may be instead communicated via some other stream. For example, service information 308 may instead be communicated via the messaging stream 320. Other variations are contemplated.

Figure 4:
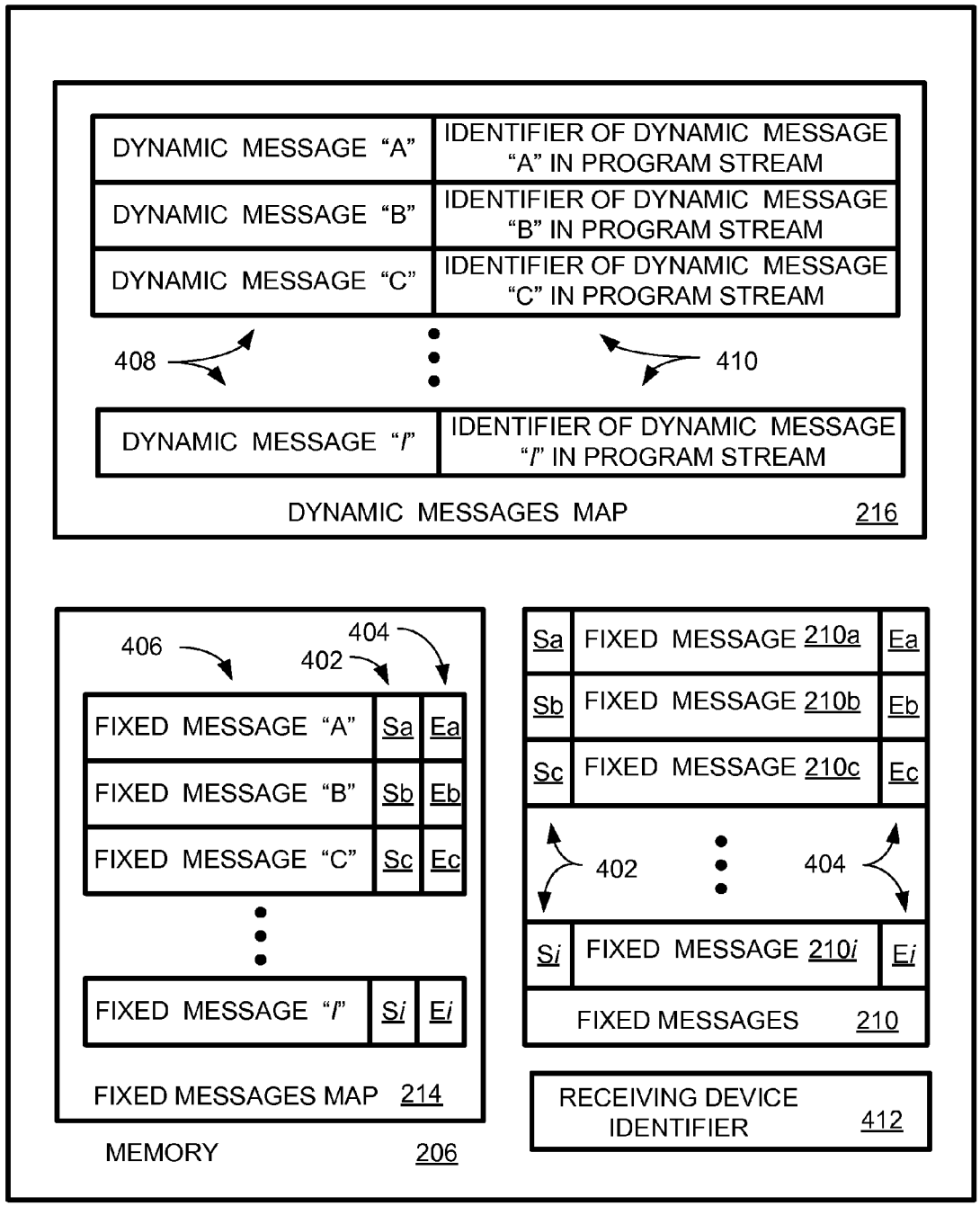
FIG. 4 is a block diagram illustrating an example fixed messages map, a plurality of fixed messages, and a dynamic messages map.

FIG. 4 is a block diagram illustrating an example fixed messages map 214 and a plurality of fixed messages 210a-210i. Here, a starting address 402 and an ending address 404 identifies the physical location of each of the fixed messages 210a-210i. For example the example fixed message 210a starts at a physical memory location address "Sa" and ends at a physical memory location address "Ea" in memory 206. A fixed message indicator 406, such as, but not limited to a logical address, resides in the fixed messages map 214. The fixed message indicator 406 is associated with the starting address 402 and ending address 404 for its corresponding fixed message.

A message presentation request 310 may be received with a fixed message indicator 406. The fixed message indicator 406 points to or otherwise identifies one of a plurality of fixed messages 210. For example, a fixed message indicator 406 may indicate that the example fixed message 210a is to be presented. In response, the processing system 204 looks up the starting address 402 ("Sa") and ending address 404 ("Eb") of the example fixed message 210a from the fixed messages map 214, and then retrieves the example fixed message 210a from memory 206 based upon the starting address 402 and the ending address 404. The retrieved fixed message 210a is then communicated to presentation device 120 (FIG. 1). Thus, a message 220 (FIG. 2) corresponding to the fixed message 210a is presented on presentation device 120.

Other embodiments may provide mapping to fixed messages 210 in a different manner. For example, the physical location of a fixed message 210 may be identified by other types of indicia corresponding to, but not limited to, a starting address plus a message length, a starting address plus a field width, a unit of memory, a block or memory, a register, or the like. Alternatively, or additionally, other suitable data structures may be used to provide mapping, such as, but not limited to, hash tables, associative arrays, linked lists, or the like.

The plurality of fixed messages 210a-210i may be stored by the processing system 204 of each receiving device 118 in a manner that is suitable for the particular memory system that is employed. It is to be appreciated that there may be many different types of receiving devices 118 and their attendant memory systems. These various different types of receiving devices 118 are operable to receive programming from a common program distributor 106. Since a suitable mapping system or the like is used to identify memory locations where fixed messages 210a-210i are stored, the fixed messages map 214 can be populated with information which identifies the physical location in the particular memory 206 in which the fixed messages 210a-210i are stored. Accordingly, when a message presentation request 310 is received, the fixed message indicator 406 identifies a particular fixed message 210. Since the location of the particular fixed message 210 is found in the fixed message map 214, the message presentation request 310 may be device independent. That is, a single message presentation request 310 may be operable to cause presentation of the fixed message 210 by different types receiving devices 118 and/or memories 206.

FIG. 4 further illustrates an example dynamic messages map 216. Here, the dynamic messages map 216 indicates a dynamic message 312 in an information stream such as the program stream 302, the service stream 304, and/or the messaging stream 320. When a message presentation request 310 is received to present a dynamic message 312, assuming that the message presentation request 310 is directed to that particular receiving device 118, the message presentation request 310 includes a dynamic message indicator 408. The dynamic message indicator 408 points to or otherwise identifies one of a plurality of dynamic messages by its identifier 310.

As noted above, information in the program stream 302, the service stream 304, and/or the messaging stream 320 is identified with suitable identifier. For example, in a packetized system, each packet of information is identified with a suitable identifier in the packet header. In such a packetized system, a dynamic message 312 may reside in a single packet or may be parsed into a plurality of packets. The dynamic message indicator 408 identifies the example dynamic message 312i by providing the packet identifiers directly or by mapping from the dynamic messages map 216 (which contains the identifier of dynamic messages, such as the packet identifier or the like).

In some embodiments, a dynamic message 312 may be communicated in service stream 304. For example, message presentation request 310a may be received with a dynamic message indicator 408 that indicates that the example dynamic message 312a (FIG. 3) is to be presented. In response, the processing system 204 looks up identifiers of the dynamic message 312a in the service stream 304 from the dynamic messages map 216. Then, processing system 204 monitors the service stream 304 for information corresponding to the dynamic message 312a, which is identified by its respective identifier in the service stream 304. Processing system 204 then retrieves the dynamic message 312a from the service stream 304. Processing system 204 then communicates the retrieved dynamic message 312a to presentation device 120 (FIG. 1). Thus, a message 220 (FIG. 2) corresponding to the dynamic message 312a is presented on presentation device 120.

Alternatively, or additionally, a dynamic message 312 may be communicated in program stream 302. For example, dynamic message 312i is illustrated as residing in program stream 302. Thus, the dynamic message indicator 408 identifies the example dynamic message 312i in the program stream 302. Then, processing system 204 monitors the program stream 302 for information corresponding to the dynamic message 312i, which is identified by its respective identifier in the service stream 304. Processing system 204 then retrieves the dynamic message 312i from the program stream 302. Processing system 204 communicates the retrieved dynamic message 312i to presentation device 120 (FIG. 1). Thus, a message 220 (FIG. 2) corresponding to the dynamic message 312i is presented on presentation device 120.

Furthermore, a dynamic message 312 and/or a message presentation request 310 may be communicated via the messaging stream 320. For example, message presentation request 310b may identify any one or more of the dynamic messages 312a-i that are communicated via the program stream 302, the service stream 304, and/or the messaging stream 320.

As noted above, a message presentation request includes a receiving device identifier 412 such that when a message presentation request 310 is received, the receiving device 118 can check its receiving device identifier 412 with the receiving device identifier in the message presentation request 310. If the receiving device identifiers do not correspond, then the fixed or dynamic message identified in the message presentation request 310 is not retrieved and presented. On the other hand, if the receiving device identifiers do correspond, then the fixed or dynamic message identified in the message presentation request 310 is retrieved and presented.

Receiving device identifier 412 may be any suitable identifier that identifies a receiving device 118. For example, a smart card identifier, a serial number, or another indicia unique to the receiving device 118 may be a suitable receiving device identifier 412. Accordingly, when the message presentation request 310 specifically identifies a particular receiving device 118, that receiving device 118 will retrieve and present the fixed and/or dynamic message of the message presentation request 310.

It is to be appreciated that a message presentation request 310 may contain a plurality of unique identifiers, such as a list or a range of identifiers, that identify a selected group of receiving devices 118. Accordingly, the group of identified receiving devices 118 present the fixed and/or dynamic message of the message presentation request 310.

Alternatively, or additionally, the identifying information may be characteristics of the receiving device 118, such as a model type or series. Accordingly, when the message presentation request 310 identifies a particular model, a series, or a common type of receiving device 118, those receiving devices 118 retrieve and present the fixed and/or dynamic message of the message presentation request 310. It is to be appreciated that a message presentation request 310 may have a plurality of unique identifiers that identify a plurality of selected groups of receiving devices 118 such that the groups of receiving devices 118 present the fixed or dynamic message.

Alternatively, or additionally, the identifying information may be geographical information pertaining to the location of the receiving device 118, such as a telephone area code, a mailing zip code, or other suitable geographic identifier. Accordingly, when the message presentation request 310 identifies a plurality of receiving devices 118 by a geographic characteristic, those receiving devices 118 retrieve and present the fixed and/or dynamic message of message presentation request 310. It is to be appreciated that a message presentation request 310 may have a plurality of unique geographical identifiers that identify a plurality of selected geographic groups of receiving devices 118 such that the groups of receiving devices 118 present the fixed or dynamic message identified in the message presentation request 310.

A non-limiting example of the use of an embodiment of a dynamic messaging system 100 is now described. Assume that the fixed message "We have not yet received your monthly payment for service. Please call us at (123)456-7890." is to be presented by a receiving device 118 having serial number or smart card number "abcd1234xwz" that is located in Denver, Colo. Further assume that a fixed message indicator "001" identifies location of a fixed message residing in a memory of the receiving device 118.

Assume that a message presentation request 310 having an identifier of the receiving device 116 (serial number "abcd1234xwz") and the fixed message indicator "001" corresponding to the above-described fixed message is inserted into program stream 302 and/or in the service stream 304. Since the message presentation request 310 identifies the particular receiving device 118, the receiving device 118 retrieves and presents the above described fixed message corresponding to the "001" fixed message indicator.

Next, assume that the program distributor 106 wishes to present a dynamic message to the above-described receiving device 118 (with serial number "abcd1234xwz") and to a plurality of other receiving devices 118 in the Denver area. For example, assume that the dynamic message is "The Denver Broncos are playing the Raiders tonight on Channel A." Further assume that a dynamic message indicator "002" is associated with the dynamic message which is communicated in a program stream 302 or a service stream 304.

A message presentation request 310 having an identifier corresponding to the geographic indicator "Denver, Colo." and the dynamic message indicator "002" corresponding to the above-described dynamic message is inserted into program stream 302 and/or in the service stream 304. Since the message presentation request 310 identifies the particular receiving device 118 because it is within the specified geographic area (Denver, Colo.), the receiving device 118 retrieves and presents the above described dynamic message corresponding to the "002" fixed message indicator ("The Denver Broncos are playing the Raiders tonight on Channel A").

Next assume, a week later, that Denver is again playing at night. However, assume that the Broncos are now playing the Cowboys. Thus, the dynamic message is changed to "The Denver Broncos are playing the Cowboys tonight on Channel A." The dynamic message may be conveniently changed by the program distributor 106 or by another party.

A message presentation request 310 having an identifier corresponding to the geographic indicator "Denver, Colo." and the dynamic message indicator "002" corresponding to the above-described new dynamic message is inserted into program stream 302 and/or in the service stream 304 at an appropriate time. Since the message presentation request 310 identifies the particular receiving device 118 because it is within the specified geographic area (Denver, Colo.), the receiving device 118 retrieves and presents the above described new dynamic message corresponding to the "002" fixed message indicator ("The Denver Broncos are playing the Cowboys tonight on Channel A").

Further, assume that during the game a special interest event occurs, such as a record breaking touchdown. The dynamic message can then be changed and another message presentation request could be transmitted to the receiving devices in Denver (or even the receiving devices in other areas where viewers are interested in the Cowboys). Because of the dynamic nature of a dynamic message, embodiments of the dynamic messaging system 100 may communicate any message to a receiving device 118 for presentation by communicating a suitable message presentation request 310 that identifies receiving devices 118 of interest and that specifies a dynamic message indicator which indicates where in a service stream or program stream a dynamic message is located.

In some embodiments, the fixed messages map 214 may be stored in a first memory, and the fixed messages 210a-210i may be stored in a different second memory. Thus, the fixed messages 210a-210i may be relatively more accessible for updating or the like. For example, updated fixed messages 210a-210i may be loaded into a smart card or the like. The smart card with the updated fixed messages 210a-210i may then be coupled to a receiving device 118.

In some embodiments, multiple fixed and/or dynamic messages may be presented on a presentation device 120 by embodiments of the dynamic messaging system 100. Such embodiments communicate a plurality of fixed and/or dynamic message indicators in a message presentation request 310. Or, a single index may identify a plurality of fixed and/or dynamic messages. The single index could reside in the above described fixed messages map 214 and/or the dynamic messages map 216, and point to a plurality of other indicators or to a plurality of locations in memory 206, a service stream 304, or a program stream 302.

In some embodiments, the received fixed message indicator 406 may have encoded therein a physical memory address (es) of the fixed message. Such a message presentation request 310 may be advantageous when presenting, for example, a service message that is unique for the specific receiving device 118 that is presenting the fixed message.

In some embodiments, the received dynamic message indicator 408 may have encoded therein a location of the dynamic message in a program stream 302 and/or a service stream 304. Thus, the dynamic message map 216 would be omitted or optional.

In some situations, a receiving device may have its tuner 202 (FIG. 2) set to receive a single program stream selected from a plurality of communicated program streams. Accordingly, a message presentation request 310 may be communicated in all of the program streams to ensure that the receiving device 118 receives the message presentation request 310. Alternatively, the message presentation request 310 may be included in a single program stream such that the message presentation request 310 is received only if the receiving device 118 is set to that program stream. Further, the message presentation request 310 may pertain to a particular program in the program stream (having multiple programs therein). Accordingly, the receiving device 118 would present the message only if that particular program is being currently presented to a presentation device 120.

Some embodiments of a receiving device 118 have a plurality of tuners 202a-202i. If a message presentation request 310 with a dynamic message indicator is received, the receiving device 118 may select and set one of its tuners 202a-202i to the service stream 304 such that presentation of a program received by another tuner is not interrupted. That is, the program stream 302 received by a first tuner continues to receive the program, and the second tuner monitors the service stream 304 for the dynamic message 312 therein. When the dynamic message 312 is received from the service stream 304, the dynamic message 312 may then be presented.

Figure 5:
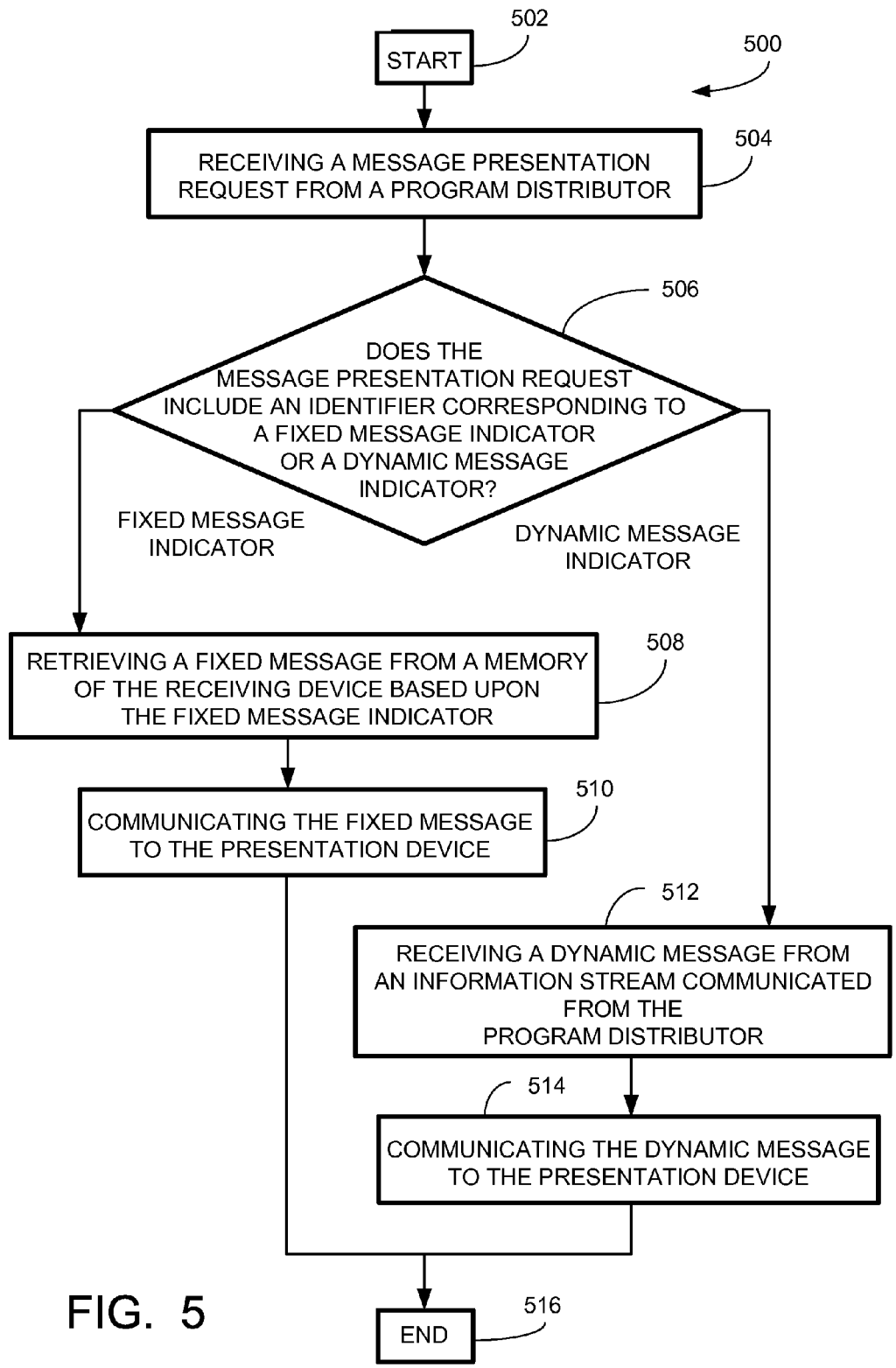
FIG. 5 is a flowchart illustrating a process used by an example embodiment of the dynamic messaging system.

FIG. 5 is a flowchart 500 illustrating a process used by an embodiment of a dynamic messaging system 100 (FIG. 1). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 5, the process 500 is ongoing with operation of the receiving device 118 (FIG. 1), and is illustrated as starting at 502. At 504, a message presentation request is received from a program distributor. The message presentation request has a first identifier that identifies the receiving device and a second identifier corresponding to one of a fixed message indicator and a dynamic message indicator. At 506, a determination is made whether the message presentation request includes an indicia corresponding to a fixed message indicator or a dynamic message indicator. At 508, in response to receiving the message presentation request identifying the receiving device and the fixed message indicator, a fixed message is retrieved from a memory of the receiving device based upon the fixed message indicator. Then, at 510, the fixed message is communicated to the presentation device. Alternatively at 512, or additionally at 512, in response to receiving the message presentation request identifying the receiving device and the dynamic message indicator, a dynamic message is received from an information stream, such as a program stream, a service stream, and/or a messaging stream, communicated from the program distributor. Then, at 514, the dynamic message is communicated to the presentation device. The process ends at 516.

While various embodiments have been described hereinabove, it is to be appreciated that various changes in form and detail may be made without departing from the spirit and scope of the invention(s) presently or hereafter claimed.

The invention claimed is:

1. A method for presenting messages on a presentation device, comprising:
receiving at a receiving device a message presentation request from a program distributor, the message presentation request having a first identifier that identifies at least one receiving device and a second identifier corresponding to one of a fixed message indicator and a dynamic message indicator, wherein the first identifier and the second identifier are already included in the message presentation request at a point the message presentation request is received from the program distributor, and wherein the second identifier is directly indicative of whether to retrieve a fixed message from a memory of the receiving device or instead receive a dynamic message via an information stream communicated from the program distributor;
in response to receiving the fixed message indicator and the message presentation request identifying the receiving device as one of the at least one receiving devices, retrieving the fixed message from the memory of the receiving device based upon the fixed message indicator;
in response to receiving the dynamic message indicator and the message presentation request identifying the receiving device as one of the at least one receiving devices, receiving the dynamic message via the information stream communicated from the program distributor; and
presenting one of the fixed message and the dynamic message on the presentation device.

2. The method of claim 1 wherein receiving the dynamic message indicator further comprises:
receiving a plurality of dynamic messages via the information stream, each of the dynamic messages uniquely identified by one of a plurality of dynamic message indicators; and
retrieving the dynamic message communicated to the presentation device from the plurality of dynamic messages based upon the received dynamic message indicator.

3. The method of claim 1 wherein the dynamic message resides in the information stream, and wherein receiving the dynamic message indicator further comprises:
monitoring the information stream for the dynamic message; and
retrieving the dynamic message from the information stream.

4. The method of claim 1 wherein the information stream is one or a program stream, a service stream, or a messaging stream.

5. The method of claim 1, further comprising:
storing the fixed message in the memory of the receiving device, wherein a location of the fixed message in the memory is identified by the fixed message indicator; and
retrieving the fixed message from the memory based upon the fixed message indicator.

6. The method of claim 5 wherein receiving the fixed message indicator further comprises:
receiving a starting memory address,
wherein the starting memory address defines a location of the fixed message residing in the memory of the receiving device.

7. The method of claim 5 wherein receiving the fixed message indicator further comprises:
receiving a logical address; and
retrieving a starting memory address from a logical address table based upon the received logical address,
wherein the starting memory address defines a location of the fixed message residing in the memory of the receiving device.

8. The method of claim 1 wherein receiving the identifier of the receiving device comprises:
receiving a unique identifier of the receiving device.

9. The method of claim 1 wherein receiving the identifier of the receiving device comprises:
receiving an identifier that identifies a plurality of receiving devices based upon a geographic location, wherein the receiving device is one of the plurality of receiving devices identified by the geographic location.

10. The method of claim 1 wherein receiving the identifier of the receiving device comprises:
receiving an identifier that identifies a plurality of receiving devices based upon a characteristic of the plurality of receiving devices, wherein the receiving device is one of the plurality of receiving devices identified by the characteristic.

11. The method of claim 1 wherein presenting one of the fixed message and the dynamic message on the presentation device comprises:
    communicating the fixed message to the presentation device.

12. The method of claim 1 wherein presenting one of the fixed message and the dynamic message on the presentation device further comprises:
    communicating the dynamic message to the presentation device.

13. A system which presents messages on a presentation device, comprising:
    a receiving device comprising:
       a memory operable to store a fixed message indicator, a dynamic message indicator, and a fixed message, the fixed message stored at a location corresponding to the fixed message indicator;
       a tuner operable to receive, from a program distributor, a message presentation request having a first indicia that identifies at least one receiving device and a second indicia that specifies one of the fixed message indicator and the dynamic message indicator, wherein the first indicia and the second indicia are already included in the message presentation request at a point the message presentation request is received from the program distributor by the tuner, and wherein the tuner is operable to determine whether to retrieve the fixed message from the memory or instead receive a dynamic message via an information stream communicated from the program distributor to the tuner based on whether the second indicia specifies the fixed message indicator or the dynamic message indicator; and
       a processing system coupled to the tuner and the memory, and in response to the message presentation request identifying the receiving device as one of the at least one receiving device, is operable to retrieve the fixed message from the memory in response to the message presentation request having the second indicia corresponding to the fixed message indicator, to retrieve the dynamic message from an information stream in response to the message presentation request having the second indicia corresponding to the dynamic message indicator, and to present of one of the fixed message and the dynamic message on the presentation device.

14. The system of claim 13 wherein the dynamic message indicator indicates a location in a messaging stream where the dynamic message resides.

15. The system of claim 13 wherein the dynamic message indicator indicates a location in a program stream where the dynamic message resides.

16. The system of claim 13 wherein the memory comprises:
    a first memory coupled to the processing system, wherein the first memory stores the fixed message indicator; and
    a second memory coupled to the processing system, wherein the second memory stores the fixed message.

17. The system of claim 16 wherein the first memory is a non-volatile memory and the second memory is a volatile memory.

18. A non-transitory computer-readable storage medium storing instructions which, when executed by a processing system in a receiving device, cause the processing system to:
    process a message presentation request received from a program distributor, the message presentation request having a first identifier that identifies at least one receiving device and a second identifier corresponding to one of a fixed message indicator and a dynamic message indicator, wherein the first identifier and the second identifier are already included in the message presentation request at a point the message presentation request is received from the program distributor, and wherein the second identifier is directly indicative of whether to retrieve a fixed message from a memory of the receiving device or instead receive a dynamic message via an information stream communicated from the program distributor;
    in response to receiving the fixed message indicator and the message presentation request identifying the receiving device as one of the at least one receiving devices, retrieve the fixed message from the memory of the receiving device based upon the fixed message indicator;
    in response to receiving the dynamic message indicator and the message presentation request identifying the receiving device as one of the at least one receiving devices, receive the dynamic message from the information stream and the service stream communicated from the program distributor; and
    initiate presentation of one of the fixed message and the dynamic message on the presentation device.

19. The non-transitory computer-readable storage medium of claim 18 wherein the instructions of the computer-readable storage medium are operable to cause the processing system to communicate the retrieved fixed message and the received dynamic message to a presentation device.

* * * * *